FIG. 1.

CHARLES PREUSS
INVENTOR

HUEBNER, BEEHLER & WORREL
ATTORNEYS

Sept. 6, 1960
C. PREUSS
2,951,603
CONTAINER HANDLING MACHINE
Filed Sept. 30, 1957
5 Sheets-Sheet 2

CHARLES PREUSS
INVENTOR
HUEBNER, BEEHLER & WORREL
ATTORNEYS
BY Richard M. Worrel Sept. 6, 1960

C. PREUSS 2,951,603

CONTAINER HANDLING MACHINE

Filed Sept. 30, 1957

CHARLES PREUSS
INVENTOR

HUEBNER, BEEHLER & WORREL
ATTORNEYS

BY
*Richard M. Worrel*

United States Patent Office 2,951,603
Patented Sept. 6, 1960

2,951,603

CONTAINER HANDLING MACHINE

Charles Preuss, 8690 N. Minnewawa, Clovis, Calif.

Filed Sept. 30, 1957, Ser. No. 687,330

8 Claims. (Cl. 214—311)

The present invention relates to a container handling machine and more particularly to an apparatus for automatically inverting a container gently to empty the contents thereof and for subsequently returning the container to upright position.

In the preparation of fresh fruit for market, it is conventional to pick the fruit in the orchard and to place it in boxes provided for the purpose which are transported to a packing house by suitable orchard wagons. Conventionally, workmen carry the boxes of fruit by hand or hand trucks and dump them onto conveyers or into bins where the fruit is culled, graded, and packed by other workmen. Although this system of processing has been practiced for many years, it is subject to several disadvantages.

The marketing of fresh fruit is a highly competitive business in which only the most efficient survive and in which the saving of a few cents per box of fruit may make the difference between profit and loss on a season's operations. The manual labor required in conveying the boxes of fruit from orchard wagons into the packing houses and depositing the fruit for packer convenience is excessive in view of the competitive conditions. Further, the manual laborers utilized are frequently not as careful with the fruit as required and excessive damage occurs. Most fruits when they are sufficiently ripe for picking are tender and bruise quite easily. The rejection of fruit because of damage incurred after picking and before packing is a serious loss in most packing houses. Even the discharge of fruit from their picking boxes onto packing conveyers or into packing bins frequently results in excessive damage unless cautiously performed.

Accordingly, it is an object of the present invention to minimize the manual labor required and the expenses incident to conveying and emptying containers.

Another object is to provide a machine for automatically inverting containers such as fruit boxes and the like.

Another object is automatically to remove fruit or other articles which are easily damaged from a container in a gentle manner so as to avoid bruising or other damage thereto.

Another object is to minimize waste and inefficiency in the processing of fruit for market.

Another object is to invert containers to discharge their contents, to separate the contents from the containers for subsequent processing, and to return the empty containers into upright attitudes for storage and/or re-use.

Other objects are to provide a container handling machine which is economical to construct and operate, durable in form, dependable in operation, adapted to handle a variety of containers either in empty or loaded condition, and which is highly effective for accomplishing its intended purposes.

These, together with other objects will become more fully apparent upon reference to the following description.

In the drawings:

Fig. 4 is a fragmentary horizontal section taken on line 4—4 in Figs. 1 and 2.

Fig. 5 is a transverse vertical section taken on line 5—5 of Fig. 1.

Referring in greater detail to the drawings, a support frame is generally indicated by the numeral 10 and may be of any suitable construction adequate for the purpose. As illustrated, the frame includes a plurality of vertical posts 11 interconnected by upper and lower longitudinally extended horizontal frame members 12, and further interconnected by a plurality of upper and lower transversely extended, horizontal frame members 13. Preferably, the support frame is made mobile by mounting it on a plurality of casters 14.

Figure 1:
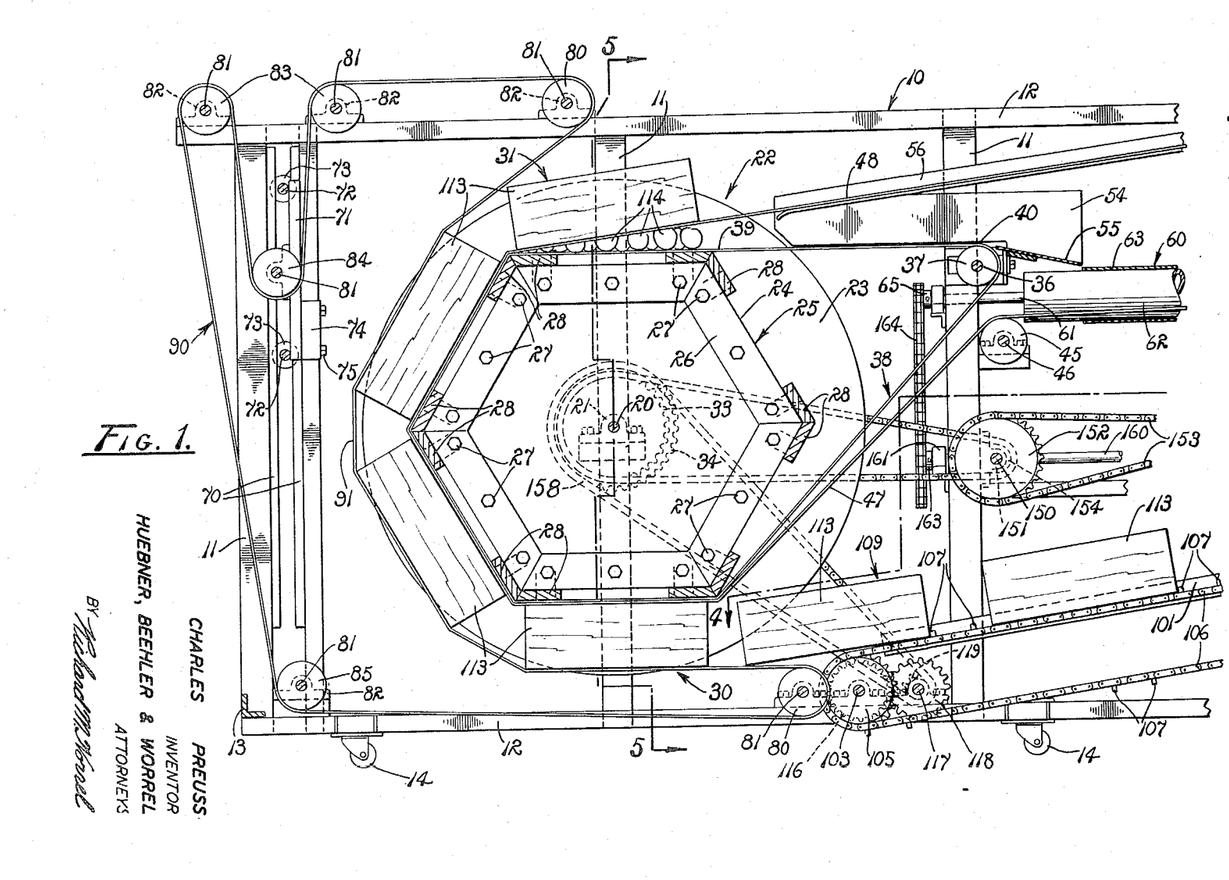
Fig. 1 is a fragmentary vertical section taken through a container handling apparatus embodying the principles of the present invention.
Figure 3:
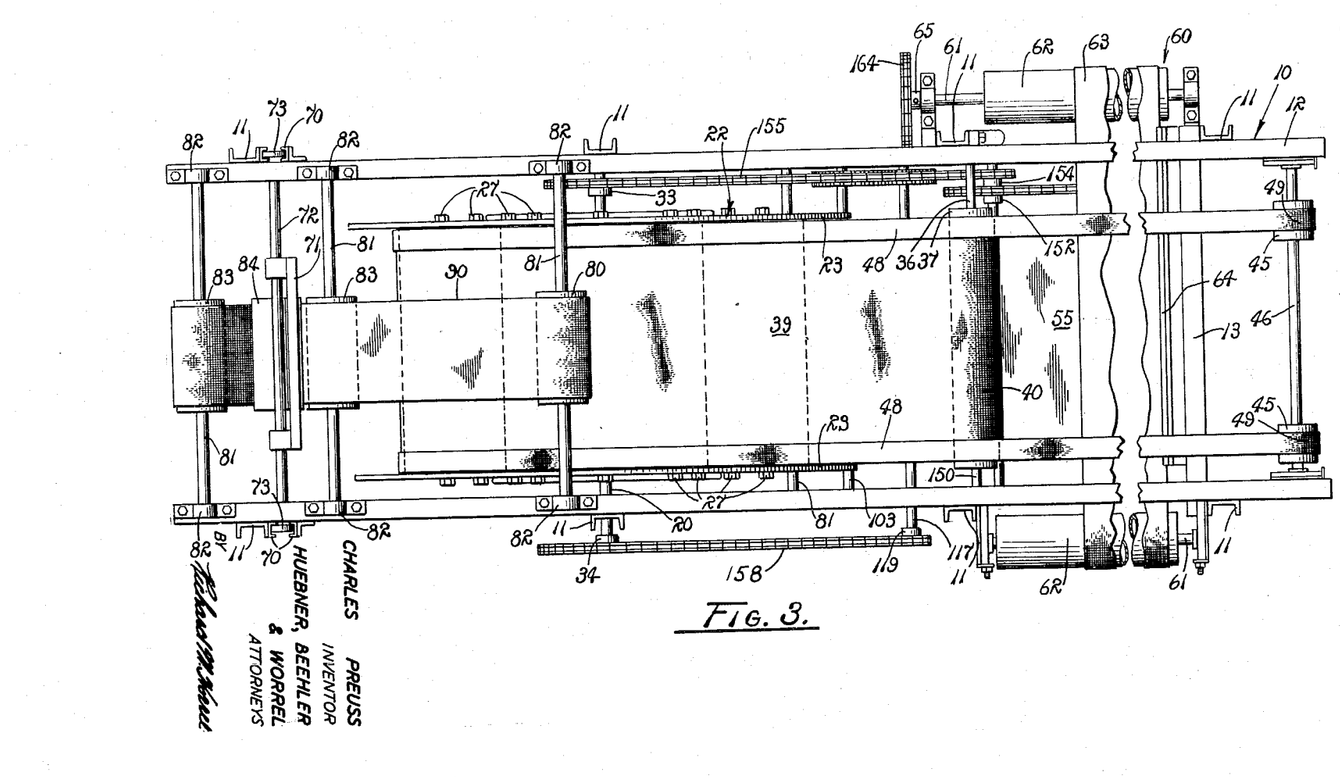
Fig. 3 is a fragmentary top plan view of the container handling apparatus which is foreshortened for illustrative convenience.
Figure 5:
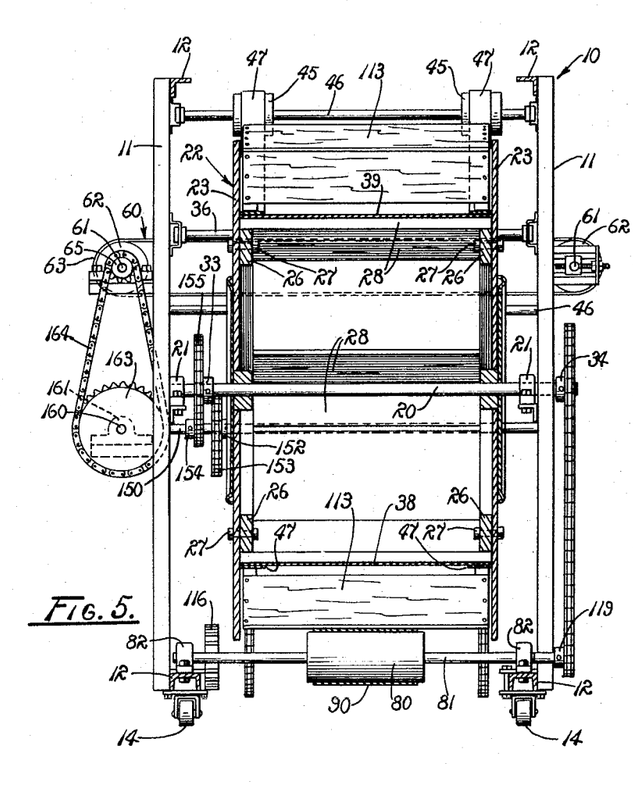

With particular reference to Figs. 1, 3, and 5, an elongated shaft 20 is supported in a horizontal position by means of bearings 21 secured to a pair of opposite vertical posts 11. A container inverting carrier wheel 22 includes a pair of axially spaced circular end discs 23 secured to the shaft, and a plurality of side portions 24 rigidly interconnecting the discs and connected to each other in hexagonal relationship to define a periphery 25 for the wheel. Specifically the side portions include a plurality of ledge members 26 secured by bolts 27 to the inwardly disposed surfaces of the discs and endwardly fitted in said hexagonal relationship. A plurality of side ribs 28 have opposite ends rested on and secured to the ledge members. The ribs extend in axially parallel relation between the discs and in radially spaced relation to the shaft. Each side portion, therefore, is defined by a pair of end ledge members interconnected by a pair of peripherally spaced side ribs. The wheel is mounted for rotation by means of the shaft for movement of the side portions between a lower horizontal container receiving station, generally indicated by the numeral 30 to an upper horizontal container emptying and inverting station, generally indicated by the numeral 31, and return. A driven sprocket 33 is secured to one end of the shaft 20, and a drive sprocket 34 is secured to the opposite end of the shaft. It will be understood that although the carrier wheel shown is of the form of a right hexagonal prism other polygonal prismatic forms are equally as well suited to the purpose. It is to be noted that the wheel disclosed, in effect, provides a plurality of substantially rectangular faces, that is the side portions 24, tangential to a common circle concentric to the shaft 20, extended continuously about said shaft, and with adjacent faces meeting in substantially equal angular relation to each other.

Figure 2:
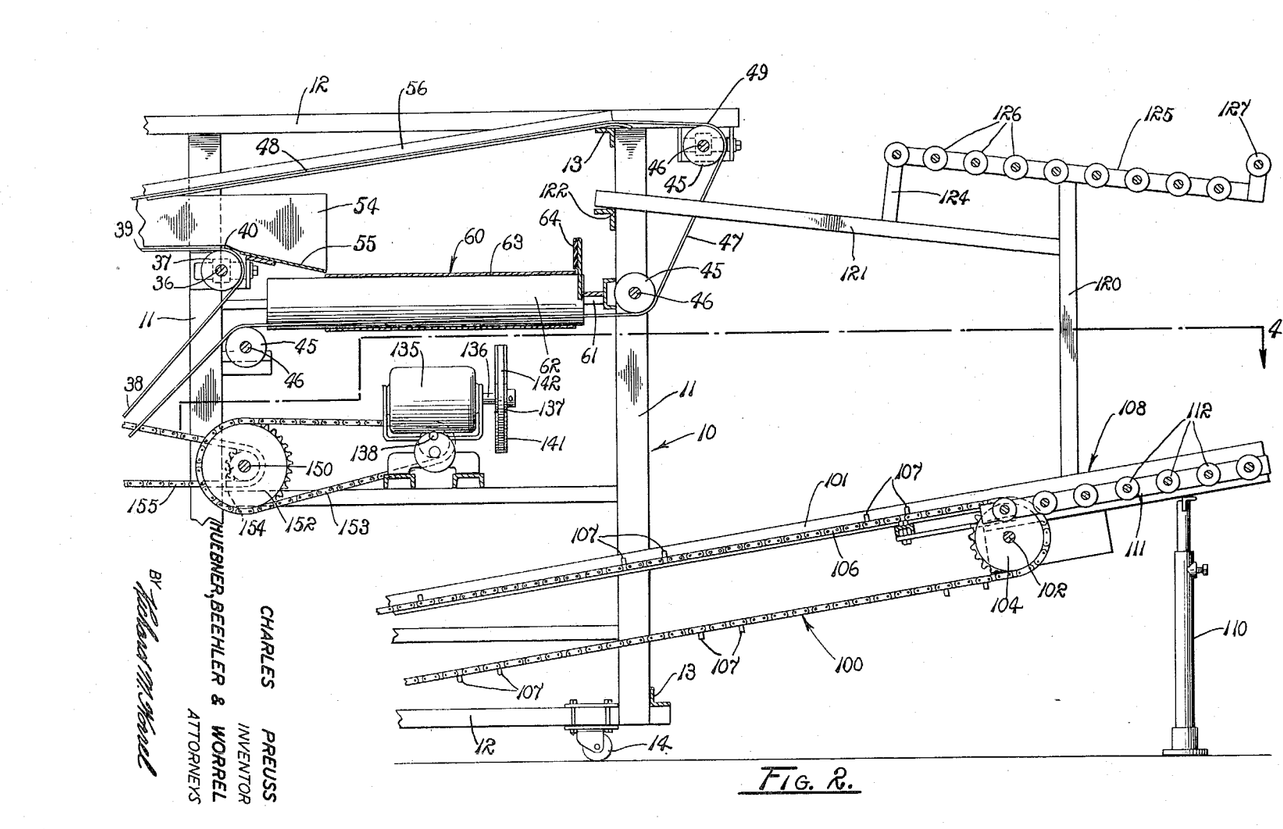
Fig. 2 is a fragmentary vertical section taken through another portion of the apparatus. It is to be noted that by placing Fig. 1 to the left of Fig. 2, a complete vertical cross section of the apparatus is presented with parts at the right of Fig. 1 and at the left of Fig. 2 being drawn in each figure to enable an understanding of the interconnection of these portions of the apparatus.

With reference to Figs. 1, 2, and 3, an elongated shaft 36 is journaled in the support frame 10 for rotatable movement around a substantially horizontal axis in laterally spaced parallel relation to the wheel shaft 20. A belt roller 37 of substantially the same length as the wheel 32 is secured to the shaft 36 for rotation therewith. The side portions 24 of the wheel when in their upper horizontal container emptying positions are substantially tangentially related to the upper periphery of the belt roller.

An elongated, endless flexible container covering belt 38 is extended around the belt roller and the periphery 25 of the wheel, as best seen in Fig. 1. The belt is in friction-tight engagement with the side portions of the wheel in their container receiving positions and during travel of the side portions from such receiving positions upwardly to and including their container emptying positions. The belt has an upper horizontal run 39 which is tangential to the upper periphery of the belt roller and constitutes an article conveyer having a discharge end 40 adjacent to the belt roller.

A plurality of pairs of laterally spaced tape rollers 45 are secured to spaced parallel horizontal shafts 46 mounted for rotation on the vertical posts 11 of the support frame 10. As best seen in Figs. 1 and 2, a pair of the tape rollers are provided below the belt roller 37; another pair of tape rollers is provided on the endmost pair of vertical posts on the opposite side of the belt roller from the carrier wheel 22; and a third pair of tape rollers is provided above the latter pair on the upper longitudinal frame members 12. Elongated endless flexible container lifting tapes 47 are individually extended around the tape rollers and around opposite ends of the side portions 24 of the wheel 22 in friction-tight overlying engagement with the belt 38 at the container receiving station 30 and between such station and the container emptying station 31. The tapes have upper runs 48 which are acutely angularly upwardly extended from the upper run 39 of the belt and terminate in an upper container discharging end 49.

As seen in Fig. 1, a pair of transversely spaced guide panels 54 are mounted in the support frame 10 on opposite sides of the upper discharge run 39 of the belt. A downwardly declined chute 55 is extended between the guide panels below the discharge end 40 of said upper run. Further, a pair of L-shaped rails 56 is mounted in the frame in upwardly inclined laterally spaced positions and receive the upper runs 48 of the tapes 47 for guided slidable movement over the rails from the wheel to the uppermost tape rollers 45.

A horizontal article removal conveyer 60 includes a pair of spaced shafts 61 mounted for rotation in the frame transversely of the belt shaft 36, rollers 62 secured to the shafts 61, and an endless flexible conveyer belt 63 extended around the rollers in frictional engagement therewith. As seen in Fig. 2, a resiliently compressible deflector 64 is mounted in the frame 10 adjacent to the lateral edge of the conveyer 60 on the opposite side of the conveyer from the discharge chute 55. A driven gear 65 is secured to the end of one of the conveyer shafts, as best seen in Fig. 1.

As best seen in Figs. 1 and 3, a pair of vertically disposed channels 70 are secured in one end of the frame 10 to the vertical posts 11. The channels are in transversely spaced relation. A weight attaching bar 71 is provided, and a pair of vertical spaced horizontal rods 72 are secured to the bar and have runners 73 mounted on their outer ends and slidably fitted within the channels. A weight 74 is removably connected to the bar by means of bolts 75.

A pair of band positioning rollers 80 is mounted for rotatable movement on the upper and lower longitudinal frame members 12 by means of shafts 81 journaled in bearings 82. The positioning rollers are located on opposite sides of the carrier wheel 22 substantially diametrically thereof and generally above and below the container emptying station 31 and the container receiving station 30, respectively. Actually, the lower band positioning roller is located somewhat in advance or to one side of the container receiving station, as best seen in Fig. 1. Otherwise expressed, the shafts for the container positioning rollers lie along a line extended transversely of the wheel in radially spaced relation to the wheel shaft 20 on the opposite side of such shaft from the portions of the belt 38 and tapes 47 which engage the periphery 25 of the wheel. Additionally, a pair of longitudinally spaced weight supporting band rollers 83 are secured to shafts 81 journaled for rotation in bearings 82 on the upper longitudinal frame members. A weight attaching band roller 84 is secured to a shaft 81 rotatably journaled in bearings 82 on the weight attaching bar 71. Still further, a guiding band roller 85 is secured to a shaft rotatably journaled in bearings mounted on the lower longitudinal frame members. The shafts for the band rollers are in horizontal positions in parallel relation to each other and to the shaft 20. An elongated endless flexible container handling band 90 is extended around the band rollers 80, 83, 84, 85 and has a container engaging portion 91 in frictional overlying engagement with those portions of the belt 38 and tabs 47 engaging the periphery 25 of the wheel 22. The band is yieldably urged into frictional engagement with the belt and tapes as a result of the weight 74 bearing downwardly on the weight attaching roller 84 and thereby tensioning the band. Of course, the location of the positioning rollers 80 with respect to the wheel shaft 20 cooperates with the weighted roller 84 to effect the desired tensioning and extent of compression of the band with the periphery of the wheel.

As best seen in Figs. 1 and 2, an elongated supply feed conveyer 100 is mounted in downwardly declined position and includes a pair of elongated angle brackets 101; upper and lower shafts 102 and 103 journaled for rotation in spaced parallel, horizontal positions; upper and lower sprockets 104 and 105 secured to the opposite ends of the shafts, and elongated chains 106 extended around the sprockets. A plurality of cleats 107 are secured to the chains in longitudinally spaced relation and extend transversely of the conveyer. As will be evident by reference to Figs. 1 and 2, in particular, it will be noted that the cleats are arranged in pairs so that forward and rearward cleats in each pair are spaced longitudinally of each other substantially the same distance apart as the transverse dimension of each wheel face or side portion 24. Adjacent forward and rearward cleats of adjacent pairs of cleats are spaced much closer together. The conveyer provides an upper container receiving end 108 and a lower container discharging end or station 109 adjacent to the lower band positioning roller 80 at the container receiving station 30 of the carrier wheel 22. A telescopically adjustable column 110 supports an upward extension 111 of the conveyer including a plurality of longitudinally spaced transversely extended rolls 112 adapted to deliver loaded boxes 113 of articles 114, seen at the emptying station 31 in Fig. 1, to the receiving end of the feed conveyer. It will be evident, therefore, that the spacing between forward and rearward cleats of each pair of cleats, as noted above, is slightly greater than the dimension of each container measured longitudinally of the supply conveyer when such container is supported on the conveyer.

Figure 4:
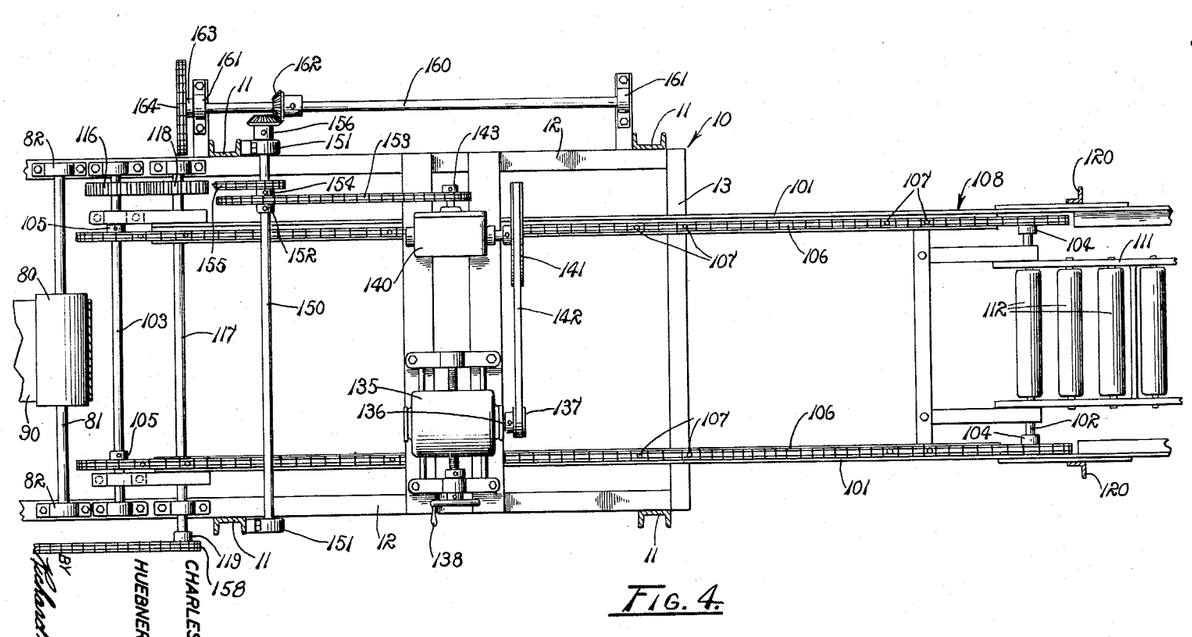

As best seen in Figs. 1 and 4, a driven gear 116 is secured to one end of the lower shaft 103 of the supply conveyer 100. An elongated counter shaft 117 is journaled in the frame 10 in spaced parallel relation to the lower conveyer shaft and provides a drive gear 118 at one end thereof in mesh with the driven gear 116 and a driven sprocket 119 at the opposite end thereof.

Vertical frame members 120 are upwardly extended from the extension 110 of the conveyer 100, and an elongated slightly downwardly declined table 121 is supported on the vertical frame members and on a transverse horizontal brace 122 secured to the adjacent endmost vertical posts 11. As such, the table is located beneath the empty container discharging end 49 of the tapes 47.

A stud 124 is upwardly extended from the table 121, and an empty container conveyer 125 is supported on the table 121, the stud, and the vertical frame members 120 in substantially parallel relation to the table. The conveyer 125 includes a plurality of longitudinally spaced transversely extended rolls 126 and has a terminal end providing an upwardly extended stop 127.

With particular reference to Fig. 2, an electric motor 135 is supported on a horizontal frame member of the support frame 10 and provides an output shaft 136 to which is secured a drive pulley 137. A belt tension control crank 138 is provided for adjusting the motor transversely of the frame, that is, transversely of its drive shaft 136. As seen in Fig. 4, a transmission mechanism 140 is also mounted on a horizontal frame member laterally of the motor and provides an input driven pulley 141 connected to the motor pulley 137 by means of an endless belt 142. An output sprocket 143 is provided on the transmission mechanism in a plane at right angles to the plane of the input pulley.

With reference to Fig. 4, an elongated wheel motivating counter shaft 150 is journaled in horizontal position in bearings 151 supported in the frame 10. The counter shaft is in parallel relation to the carrier shaft 20 but is located between the carrier shaft and the motor 134, as can be seen in Figs. 1 and 2. A driven sprocket 152 is secured to the counter shaft, and a motor chain 153 extends around this driven sprocket and the output sprocket 143. A drive sprocket 154 is also secured to the counter shaft, and a wheel motivating chain 155 extends around the latter sprocket and the driven sprocket 33. Further, a drive bevel gear 156 is secured to an end of the counter shaft laterally outwardly of the frame. A supply conveyer drive chain 158 interconnects the sprockets 34 and 119 in driven association so that when the wheel 22 rotates, the conveyer 100 is motivated.

As also best seen in Fig. 4, an elongated conveyer motivating counter shaft 160 is journaled in bearings 161 mounted on the support frame 10 and is in a substantially horizontal position in parallel relation to the conveyer shafts 61. The counter shaft is rotated by means of a driven bevel gear 162 secured to the counter shaft and in mesh with the drive bevel gear 156. A drive sprocket 163 is secured to an end of the conveyer counter shaft, and an endless conveyer chain 164 extends around the latter sprocket and the driven sprocket 64 for the removal conveyer.

*Operation*

The operation of the described embodiment of the subject invention is believed to be readily apparent and is briefly summarized at this point.

When the motor 135 is energized, it rotates the carrier wheel 22 in a clockwise direction, and travels the supply conveyer 100 in a counterclockwise direction, both as viewed in Fig. 1, and the removal conveyer 60 in a counterclockwise direction, as viewed in Fig. 5. Because of the frictional engagement of the belt 38, the tapes 47, and the band 90 with the carrier wheel 22 and with each other, motivation is imparted by the wheel to the belt in a clockwise direction, to the tapes in clockwise direction, and to the band in a counterclockwise direction, all as viewed in Fig. 1.

Loaded containers 113 of articles 114, such as peaches, are placed on the slide rolls 112 preferably with their longitudinal dimensions extended transversely of the feed conveyer 100. Each container is moved onto the receiving end 108 of the conveyer and its rearwardmost edge is engaged by one of the cleats 107 as it moves from the lower run of the conveyer to the upper run. The container is thus motivated downwardly toward the discharging end 109. It is to be observed that the containers are prevented from sliding uncontrollably down the conveyer by means of the cleats disposed forwardly of the containers.

Each container 113 is slid from the discharging end 109 of the supply conveyer 100 onto the holding band 90 immediately in advance of the receiving station 30 of the carrier wheel 22. When no containers are between the band and the wheel at the receiving station, the band angles upwardly from the lower positioning roller 80 toward the leading edge of the side portion 24 in the receiving position. It is also to be remembered at this point that the band is held in frictional engagement with the belt 38, which, in turn, is in frictional engagement with the wheel so that rotation of the wheel effects longitudinal motivation of the belt, the tapes 47 and the band.

Thus, each container 113 is moved onto the band 90 and into the receiving station 30 opposite to one of the side portions 24 of the wheel 22. At this point the tapes 47 extend across the opposite upper end edges of the container and the open top of the container is fitted against and covered by the belt 38. Further, the tension applied to the band by the weight 74 urges the band across the container and accordingly urges the container against the side portion of the wheel.

As the wheel 22 continues to rotate, the side portion 24 against which the container 113 is located moves upwardly toward and eventually into the emptying station 31. As the container travels from the receiving station to the emptying station, it is held against the periphery of the wheel by means of the band 90, as illustrated in Fig. 1, so that the contents of the container cannot escape. The discs 23 prevent axial movement of the containers, as will be evident. In the emptying station, the articles 114 remain on the belt 38 while the container is lifted by the tapes and traveled upwardly over the rails 56.

Considering first the movement of the articles 114, the belt 38 moves the articles toward the discharge end 40 of the upper run 39 where they slide down the chute 55 onto the removal conveyer 60. The articles are prevented from rolling off the opposite side of the removal conveyer by means of the deflector 64. The removal conveyer delivers the articles, if peaches for example, to a culling, sorting, and packing conveyer or table, not shown.

The empty containers 113 are carried up the upper runs 48 of the tapes and fall off the discharge end 49 onto the table 121. Because of the speed of the tapes and height of said discharge end 49 above the table, the containers strike the table and are flipped over onto the empty container conveyer 125 into an upright position. The upright empty containers then roll down the conveyer until they hit the stop 127. From here they may be removed for subsequent use or storage.

It will be evident from the foregoing that synchronous movement of the carrier wheel 22 and the supply or feed conveyer 100 is important in order to insure delivery of a container 113 onto the band 30 in directly opposite relation to a side portion or face 24 of the wheel. This movement and synchronization of the entire apparatus is obtained through the series of sprockets, gears, chains, and the like, described all of which are driven from a single motor 135. Synchronization of the wheel and supply conveyer is insured because the conveyer is driven by a sprocket 34 secured to and rotating with the wheel. It is evident from the relationship of the dimensions of the parts of the apparatus, as particularly illustrated in Fig. 1, that the linear speed of the faces or side portions 24 of the wheel and the cleats 107, as well as the band 90, is substantially the same. Therefore, the supply conveyer and the portion of the band 90 underneath the wheel at the receiving station 30 constitute a conveying means for conveying containers along a path transversely of the shaft and underneath the wheel at said receiving station. Because the supply conveyer and the band are driven by the wheel, the containers are moved in timed relation to the faces and are brought individually and successively into opposed relation with said faces. As explained, the belt 38, the tapes 47, and the band 90 are urged into frictional engagement with the wheel and each other as well as the containers when the latter are motivated by the wheel and thus are synchronized with rotation of the wheel. Further, the removal conveyer is driven from this same system.

The subject container handling apparatus enables inversion of a container from an upright position to an upside-down position, enables emptying of the container without damage to the contents thereof, separates the container from its contents, and delivers each to predetermined locations. The apparatus is of particular utility in emptying produce from containers and specifically has been found greatly to speed up the processing of fruit and produce for market in an orderly more gentle and more economical manner.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An apparatus for emptying the contents of a container having a bottom wall, upstanding side walls and an open top comprising a polygonal carrier wheel having an axis of rotation and a plurality of side portions disposed in angularly related planes substantially equally radially spaced from said axis and tangentially related to a common circle concentric to the axis; means mounting the wheel for rotation about said axis for successive movement of said side portions from substantially horizontal downwardly disposed positions to substantially horizontal upwardly disposed positions; a belt roller mounted for rotation about an axis parallel to the wheel axis and in radially spaced relation from the wheel; an endless belt extended around the belt roller and the wheel in frictional overlying contact with the side portions in said upwardly and downwardly disposed positions and during travel from the downwardly to the upwardly disposed position, rotation of the wheel effecting longitudinal movement of the belt incident to said frictional contact; a plurality of band rollers mounted for rotation on axes parallel to the wheel axis and spaced radially outwardly therefrom; an elongated endless band extended around the rollers having a portion arcuately extended substantially from the downwardly to the upwardly disposed positions of the side portions, inclusive; pressure means applied to the band transversely thereof yieldably urging the arcuately extended portion of the band into frictional overlying engagement with the belt on the wheel; and means for inserting a loaded container between the band and a side portion of the wheel at its downwardly disposed position and with the open top of the container against and covered by the belt, the band holding the container against the belt and such side portions during travel of side portion into its upwardly disposed position whereby upon removal of the container, the contents thereof remain on the belt and are conveyed thereby away from the wheel.

2. An apparatus for emptying a container containing articles to be emptied therefrom and having a bottom wall, and upstanding side walls terminating in upper edges defining an open top for the container, comprising a support frame; a container inverting wheel mounted in the frame for rotatable movement around a horizontal axis including a pair of radial end discs rigidly interconnected by a plurality of elongated side portions interconnected circumferentially of said axis in polygonal relationship and being substantially equally radially spaced from said axis inwardly of the peripheral edges of the discs, the side portions being movable from a lower horizontal receiving station to an upper horizontal container emptying station, and return; a belt roller mounted in the frame for rotatable movement around a horizontal axis in laterally spaced parallel relation to and above the wheel axis, each side member of the wheel in its upper horizontal position being tangentially related to the belt roller; an endless flexible container covering belt extended around the belt roller and the wheel in tight frictional overlaying engagement with the side portions during their movement from the container receiving station to the container emptying station and having an upper article conveying horizontal run providing a discharge end; an article removal conveyer mounted in the frame beneath the discharge end of the upper run of the belt to carry away articles deposited thereon; a pair of axially spaced tape rollers mounted in the frame for rotatable movement around a common horizontal axis in laterally spaced parallel relation to the wheel axis on the opposite side of the belt roller from the inverting wheel and above the belt roller; a pair of endless flexible container lifting tapes individually extended around the tape rollers and around opposite ends of the wheel so as to be in tight frictional overlying engagement with the belt from said container receiving station to the container emptying station, the tapes having upper runs acutely upwardly angularly extended from the upper run of the belt toward the top rollers; a plurality of band rollers mounted in the frame for rotatable movement around horizontal axes parallel to the wheel axis and in spaced relation to each other, there being a pair of the band rollers on opposite sides of the wheel generally above and below said emptying and receiving stations, respectively, and there being at least one more band roller located in laterally spaced relation to the wheel and on generally the opposite side of the wheel from the belt roller; an elongated flexible container holding band extended around the band rollers having a container engaging portion in frictional overlaying engagement with the belt on the wheel from said receiving station to said container emptying station inclusive but being yieldably movable into outwardly radially spaced relation to the wheel; a feeding conveyer for delivering containers containing articles to the container receiving station with their bottom walls rested on the band, the containers being individually positioned opposite to side portions of the wheel, the band being yieldable to permit insertion of the containers between the wheel and the band, the band further urging the upper edges of the containers into contact with the belt, a pair of opposed edges of each container overlaying the tapes whereby said article containers are carried to the emptying station wherein the articles rest on the upper run of the belt and are conveyed to its discharge end and wherein the tapes carry the containers in inverted positions upwardly away from the wheel; and drive means mounted in the frame and connected to the feeding conveyer and to the wheel for imparting synchronous rotatable movement thereto, the belt and tapes being motivated in circuitous paths around their respective rollers and the wheel by frictional engagement with the wheel and with each other respectively and the band being longitudinally motivated incident to frictional engagement with containers against the wheel and with the belt.

3. An apparatus for emptying a container containing articles to be emptied therefrom and having a bottom wall and upstanding side walls terminating in upper edges defining an open top for the container, comprising a support frame; a container inverting wheel mounted in the frame for rotatable movement around a horizontal axis including a plurality of elongated side portions interconnected circumferentially of said axis in polygonal relationship and being substantially equally radially spaced from said axis, the side portions being movable from a lower horizontal container receiving station to an upper horizontal container emptying station, and return; a belt roller mounted in the frame for rotatable movement around a horizontal axis in laterally spaced parallel relation to and above the wheel axis; an endless flexible container covering belt extended around the belt roller and the wheel in tight frictional overlaying engagement with the side portions during their movement from the container receiving station to the container emptying station and having an upper article conveying horizontal run providing a discharge end; a pair of axially spaced tape rollers mounted in the frame for rotatable movement around a common horizontal axis in laterally spaced parallel relation to the wheel axis on the opposite side of the belt roller from the inverting wheel and above the belt roller; a pair of endless flexible container lifting tapes individually extended around the tape rollers and around opposite ends of the wheel so as to be in tight frictional overlaying engagement with the belt from said container receiving station to the container emptying station, the tapes having upper runs acutely upwardly angularly extended from the upper run of the belt toward the tape rollers; a plurality of band rollers mounted in the frame for rotatable movement around horizontal axes parallel to the wheel axis and in spaced relation to each other, there being a pair of band rollers on opposite sides of the wheel generally above and below said emptying and receiving stations, respectively, there being another pair of said band rollers in substantially the same horizontal plane and in laterally spaced relation to the wheel and on the opposite sides thereof from the belt roller, and a fifth band roller located beneath and generally between said coplanar rollers; an elongated flexible container holding band extended around the band rollers having a container engaging portion in frictional overlying engagement with the belt on the wheel from said receiving station to said container emptying station inclusive but being yieldably movable into outwardly radially spaced relation to the wheel; a weight; means longitudinally slidably adjustably mounted in the frame connecting the weight to said fifth roller thereby applying a force transversely to the band yieldably to urge said container engaging portion into frictional engagement with the belt and with containers positioned against the wheel; a feeding conveyer for delivering containers containing articles to the container receiving station with their bottom walls rested on the band, the containers being individually positioned opposite to side portions of the wheel, the band being yieldable to permit insertion of the containers between the wheel and the band, the band further urging the upper edges of the containers into contact with the belt, a pair of opposed edges of each container overlaying the tapes whereby said article containing containers are carried to the container emptying station wherein the articles rest on the upper run of the belt and are conveyed to its discharge end and wherein the tapes carry the containers in inverted positions upwardly away from the wheel; and drive means mounted in the frame and connected to the wheel feeding conveyer and to the wheel for imparting synchronous rotatable movement thereto, the belt and tapes being motivated in circuitous paths around their respective rollers and the wheel by frictional engagement with the wheel and with each other respectively, and the band being longitudinally motivated incident to frictional engagement with containers against the wheel and with the belt.

4. An apparatus for emptying the contents of a container having a bottom wall, upstanding side walls and an open top comprising a polygonal carrier wheel having an axis of rotation and a plurality of side portions disposed in angularly related planes substantially equally radially spaced from said axis and tangentially related to a common circle concentric to the axis; means mounting the wheel for rotation about said axis for successive movement of each of said side portions from a substantially horizontal downwardly disposed receiving position to a substantially horizontal upwardly disposed emptying position; a belt roller mounted for rotation about an axis parallel to the wheel axis and in radially spaced relation from the wheel; an endless belt extended around the belt roller and the wheel in frictional overlying contact with the side portion in said upwardly and downwardly disposed positions and during travel from the downwardly disposed position to the upwardly disposed position, rotation of the wheel effecting circuitous movement of the belt incident to said frictional contact, the belt including an upper discharge run extended away from the wheel at said emptying position; means successively delivering loaded containers into said receiving position with the open tops thereof individually against the side portions of the wheel as such side portions successively move into said receiving positions, the side portions of the wheel being individually of the same shape as and of larger size than the open tops of the containers so that when the top of a container is against a side portion at said receiving station, the belt is in covering relation to said open top; means extended in an arcuate path from said receiving position to said emptying position for holding the containers against the belt and the side portions during travel of said side portions from said receiving position to said emptying position; and means connected to the holding means yieldably urging the same inwardly against said side portions between the receiving and emptying stations and in contact with the belt and being yieldable outwardly away from the belt to admit containers between the wheel and said holding means whereby the containers are pressed against the wheel during movement from the receiving stations and the emptying station, said discharge run being adapted to receive the dumped contents of the containers at said emptying position and to convey the same away from the wheel.

5. In an apparatus for inverting open top containers of articles for removing the articles therefrom; a frame; a polygonal prismatic wheel having an axis of rotation and a plurality of substantially rectangular flat faces extended continuously about said axis with adjacent faces meeting in substantially equal angular relation to each other; means mounting the wheel in the frame for rotation about said axis in a substantially horizontal attitude and for enabling movement of the faces in a circuitous path successively into a downwardly directed container receiving station and an upwardly directed container inverting station; container conveying means mounted in the frame and extended transversely of the axis of rotation of the wheel and underneath the wheel at said receiving station for successively conveying open top containers of articles in upright positions along a second path extended transversely of the axis of rotation of the wheel and underneath the wheel at said receiving station; means coupling the wheel and container conveying means in driven association for movement of the wheel faces and the open tops of the containers on the container conveying means along their respective paths in timed relation thereby to bring the open tops of the containers and said faces successively and individually into opposed mating relation at said receiving station; means engaging the container conveying means yieldably urging said conveying means toward the wheel where such conveying means extends underneath the wheel for yieldably urging the tops of the containers tightly against said faces at said receiving station and for enabling subsequent movement of the containers with their respective mating faces successively into said inverting station; and article conveying means mounted in the frame adjacent to said inverting station of the wheel for receiving articles released from the containers incident to inversion thereof and for conveying such articles away from the wheel.

6. In an apparatus for inverting open top containers of produce for removing the produce therefrom; a frame; a polygonal prismatic wheel having an axis of rotation and a plurality of substantially rectangular flat faces extended continuously about said axis with adjacent faces meeting in substantially equal angular relation to each other; means mounting the wheel in the frame for rotation about said axis in a substantially horizontal attitude and for enabling movement of the faces in a first circuitous path successively into a downwardly directed container receiving station and thence into an upwardly directed container inverting station; a container supply conveyer mounted in the frame and including an elongated endless conveying member movable in a second circuitous path extended transversely of the axis of rotation of the wheel past a discharge station in adjacent spaced relation to said receiving station, and a plurality of cleats connected to the conveying member in predetermined longitudinally spaced relation therealong, said conveying member being adapted to support open top containers of produce individually between and for engagement by said cleats for movement along said second path; drive means interconnecting the wheel and said conveying member for movement of the wheel faces and cleats along their respective paths at substantially the same linear speed incident to rotation of the wheel; an elongated endless flexible band having an upper run providing opposite end portions; means mounting the band in the frame with an end portion of the upper run thereof in substantial alignment with the conveying member and with such end portion extended from the discharge station of the conveying member under the wheel at said receiving station; means connected to the band mounting means yieldably urging the band toward the wheel, the upper run of the band being thereby adapted to receive containers from the conveying member at said discharge station and to urge the same tightly up against said faces as the containers are urged between the faces and the band by the cleats whereby containers are positioned for travel with the faces successively into said inverting station; and a produce conveyer mounted in the frame and providing a run adjacent to the inverting station of the wheel for receiving produce from the containers as they are inverted and for carrying such produce away from the wheel.

7. The apparatus of claim 6 wherein the faces of the wheel have a transverse dimension substantially equal to the spacing between the cleats and greater than the dimension of the containers as measured longitudinally of the supply conveying member when said containers are supported thereon.

8. In a container inverting and dumping apparatus; a support; a wheel mounted in the support for rotatable movement around a substantially horizontal axis and having an outer peripheral container receiving portion circumscribing the axis and movable past predetermined lower container receiving and upper container inverting stations in spaced relation circumferentially of the wheel; an elongated endless flexible container holding band mounted in the support for circuitous travel along a predetermined path a portion of which is arcuately extended in generally concentric relation to the wheel from said container receiving station to said container inverting station; means connected to the band yieldably urging said arcuate portion against the peripheral portion of the wheel, said means being yieldable to permit movement of said arcuate portion of the band outwardly from the peripheral portion of the wheel to admit a container between the band and the wheel; a supply conveyer mounted in the support adjacent to the receiving station of the wheel for feeding a container to said receiving station and for wedging such a container between the band and the peripheral portion of the wheel at said receiving station whereby the container is frictionally grasped between the wheel and the band; drive means mounted in the support and connected to the wheel for imparting rotation to the wheel and thereby for longitudinally motivating the band due to frictional engagement of the band with the wheel for carrying such a wedged container from the receiving station to the inverting station; and a conveying member mounted in the support adjacent to said inverting station for receiving contents of such containers upon inversion thereof, said apparatus being adapted for use with filled containers having open tops, said wheel being polygonal in transverse cross-section with its peripheral portion including a plurality of substantially flat sides substantially tangentially related to a circle concentric to said horizontal axis, said conveying member including an elongated endless flexible belt and means mounting the belt in circumscribing relation to said horizontal axis in engagement with the peripheral portion of the wheel from said container receiving station to said container inverting station, in outward extension from the inverting station, and for driven circuitous movement by and incident to rotation of the wheel, the band being yieldably urged against the belt from the receiving to the inverting stations but being movable away from the belt incident to wedging of a container between the belt and the band, such a container being wedged by the supply conveyer against a flat side of said peripheral portion between the band and the belt with the open top of the container against the belt whereby the belt covers said open top and prevents escape of the contents thereof.

References Cited in the file of this patent

UNITED STATES PATENTS

| | | |
|---|---|---|
| 1,049,523 | Parker | Jan. 7, 1913 |
| 1,945,758 | Turner | Feb. 6, 1934 |
| 2,605,883 | Thames | Aug. 5, 1952 |